United States Patent
Burton et al.

(10) Patent No.: US 11,216,591 B1
(45) Date of Patent: Jan. 4, 2022

(54) INCREMENTAL AUTHENTICATION FOR MEMORY CONSTRAINED SYSTEMS

(71) Applicant: Xilinx, Inc., San Jose, CA (US)

(72) Inventors: Felix Burton, Foster City, CA (US); Krishna C. Patakamuri, Hyderabad (IN); James D. Wesselkamper, Albuquerque, NM (US)

(73) Assignee: XILINX, INC., San Jose, CA (US)

( * ) Notice: Subject to any disclaimer, the term of this patent is extended or adjusted under 35 U.S.C. 154(b) by 170 days.

(21) Appl. No.: 16/439,350

(22) Filed: Jun. 12, 2019

(51) Int. Cl.
  *G06F 21/00* (2013.01)
  *G06F 21/64* (2013.01)
  *H04L 9/32* (2006.01)

(52) U.S. Cl.
  CPC ............ *G06F 21/64* (2013.01); *H04L 9/3239* (2013.01); *H04L 9/3249* (2013.01)

(58) Field of Classification Search
  CPC ... H04L 9/3247; H04L 9/3239; H04L 9/3249; G06F 21/64; G06F 16/2255
  See application file for complete search history.

(56) References Cited

U.S. PATENT DOCUMENTS

| 6,785,815 B1 | 8/2004 | Serret-Avila et al. |
| 7,535,249 B1 | 5/2009 | Knapp |
| 8,224,638 B1 * | 7/2012 | Shirazi .................... G06F 30/34 703/16 |
| 2006/0253714 A1 * | 11/2006 | Ito ......................... G06F 21/554 713/194 |

(Continued)

OTHER PUBLICATIONS

Villanueva, John Carl, "What is a Digital Signature?" Mar. 28, 2015, pp. 1-8, [online] [retrieved on Mar. 6, 2019], Retrieved from the Internet <https://www.jscape.com/blog/what-is-a-digital-signature>.

(Continued)

*Primary Examiner* — Ghazal B Shehni
(74) *Attorney, Agent, or Firm* — Patterson + Sheridan, LLP (57) ABSTRACT

Apparatus and associated methods relate to authenticating a back-to-front-built configuration image. In an illustrative example, a circuit may include memory configured to store a signature S, a second hash $H_2$, and a first data chunk $C_1$. Signature S may be signed on a first hash $H_1$. $H_1$ may be the hash for $H_2$ and $C_1$. If signature S passes verification, a hash engine may perform hash functions on $C_1$ and $H_2$ to generate a hash $H_1'$. $H_1'$ may be compared with $H_1$ to indicate whether $C_1$ has been tampered with or not. By using the incremental authentication, a signature that appears at the beginning of the image may be extended to the entire image while only using a small internal buffer. Advantageously, internal buffer may only need to store two hashes $H_i$, $H_{i+1}$, and a data chunk $C_i$, or, a signature S, a hash $H_i$, and a data chunk $C_i$.

17 Claims, 7 Drawing Sheets

(56) References Cited

U.S. PATENT DOCUMENTS

| | | | | |
|---|---|---|---|---|
| 2008/0010462 A1* | 1/2008 | Murakami | ............ | G06F 21/64 |
| | | | | 713/176 |
| 2010/0268957 A1* | 10/2010 | Suzuki | ............ | H04L 9/3066 |
| | | | | 713/176 |
| 2011/0083015 A1* | 4/2011 | Meier | ............ | H04L 9/3236 |
| | | | | 713/176 |
| 2013/0138966 A1* | 5/2013 | Tagashira | ............ | H04L 9/3242 |
| | | | | 713/179 |
| 2018/0330095 A1* | 11/2018 | Packer Ali | ............ | G06F 21/44 |

OTHER PUBLICATIONS

Xilinx, "Zynq-7000 All Programmable SoC Overview," DS190 (v1.10), Sep. 27, 2016, pp. 1-25, Xilinx., Inc., San Jose, California, USA.

Wilkinson, Kyle, "Using Encryption and Authentication to Secure an UltraScale/UltraScale+ FPGA Bitstream," XAPP1267 (v1.3), Oct. 12, 2018, pp. 1-26, Xilinx., Inc., San Jose, California, USA.

* cited by examiner

INCREMENTAL AUTHENTICATION FOR MEMORY CONSTRAINED SYSTEMS

TECHNICAL FIELD

Various embodiments relate generally to programmable integrated circuits, and more specifically, relate to authenticating configuration image.

BACKGROUND

Data represents information that has useful value. Data can take the form of stored information. Data storage can be in analog form. Data storage can also be in digital form. Data can also be in digital format communicated between two nodes. When data is communicated, for example, it can be received and interpreted as a function of time. Some systems that receive communicated digitally-formatted data are based on a clock that determines when a voltage signal is sampled to decide whether a symbol in a data stream is, for example, a one or a zero.

Message or data integrity is quite important during data transfers. Message integrity may ensure that the received message is exactly the same message sent by the sender. Hash algorithms may be used to verify whether the received message or data is the original message or data sent out.

For sensitive files, it may be not enough to know whether the information in the files has been tampered with. You may also want to know whether the sensitive files came from the person who you think sent it. The source of the sensitive files may be authenticated. Signature may be used to authenticate whether data is authored by the correct person.

A programmable integrated circuit (IC) refers to a type of IC that includes programmable circuitry. An example of a programmable IC is a field programmable gate array (FPGA). An FPGA is characterized by the inclusion of programmable circuit blocks. Examples of programmable circuit blocks include, but are not limited to, input/output blocks (IOBs), configurable logic blocks (CLBs), dedicated random access memory blocks (BRAM), digital signal processing blocks (DSPs), processors, clock managers, and delay lock loops (DLLs).

Circuit designs may be physically implemented within the programmable circuitry of a programmable IC by loading configuration data, sometimes referred to as a configuration bitstream, into the device. The configuration data may be loaded into internal configuration memory cells of the device. The collective states of the individual configuration memory cells determine the functionality of the programmable IC. For example, the particular operations performed by the various programmable circuit blocks and the connectivity between the programmable circuit blocks of the programmable IC are defined by the collective states of the configuration memory cells once loaded with the configuration data.

SUMMARY

In one exemplary aspect, a method includes receiving a signature S for a first hash $H_1$ from a data stream for a target device. The data stream includes the signature S, n−1 hashes ($H_2, \ldots, H_n$) and n data chunks ($C_1, \ldots, C_n$). The signature S is the signature of a first hash $H_1$. The first hash $H_1$ is the hash for a first data chunk $C_1$ and a second hash $H_2$. The method also includes verifying the signature S and extracting the first hash $H_1$ when the signature S passes verification. The method also includes storing the hash $H_1$, the first data chunk $C_1$, and the second hash $H_2$. The method also includes calculating, by using a hash function, a hash $H_1'$ for the data chunk $C_1$ and the second hash $H_2$, and, comparing the calculated hash $H_1'$ with the hash $H_1$. If the calculated hash $H_1'$ doesn't match the hash $H_1$, then, the method also includes generating an invalid signal to indicate that the first data chunk $C_1$ has been tampered with.

In some embodiments, when 1<i<n, the method may also include (1) retrieving a hash $H_i$, a data chunk $C_i$, and a next hash $H_{i+1}$ from the data stream, hash $H_i$ is the hash for a data chunk $C_i$ and a next hash $H_{i+1}$, (2) storing the hash Hi, the data chunk $C_i$, and the next hash $H_{i+1}$, (3) calculating, by using the hash function, a hash $H_i'$ for the data chunk $C_i$ and the next hash $H_{i+1}$, and (4), comparing the calculated hash $H_i'$ with the hash $H_i$. If the calculated hash $H_i'$ doesn't match the hash $H_i$, then, the method may also include generating an invalid signal to indicate that the data chunk $C_i$ has been tampered with.

In some embodiments, when i=n, the method may also include (1) retrieving and storing a hash $H_n$, and a data chunk $C_n$, the hash $H_n$ is the hash for the data chunk $C_n$, (2) calculating, by using the hash function, a hash $H_n'$ for the data chunk $C_n$, and (3) comparing the calculated hash $H_n'$ with the hash $H_n$. If the calculated hash $H_n'$ doesn't match the hash $H_n$, the method may also include generating an invalid signal to indicate the data chunk $C_n$ has been tampered with.

In some embodiments, the hash function may be a secure hash algorithm 3 (SHA-3). In some embodiments the signature S may be generated by a Rivest-Shamir-Adleman Algorithm (RSA). In some embodiments, the data chunks may include data used for configuring a block of programmable logic (PL). In some embodiments, if the calculated hash $H_1'$ matches the hash $H_1$, the method may also include loading the data chunk $C_1$ to configure the block of PL. In some embodiments the target device may be a system-on-chip (SOC). The $H_i$, $C_i$, and $H_{i+1}$ may be stored in off-chip memory or on-chip memory. In some embodiments, the method may also include generating an invalid signal to indicate that the data stream is not from a valid source if the signature doesn't pass the verification.

In another exemplary aspect, a method includes receiving a first hash $H_1$ from a data stream for a target device. The data stream includes n hashes ($H_1, \ldots, H_n$) and n data chunks ($C_1, \ldots, C_n$). The first hash $H_1$ is the hash for a first data chunk $C_1$ and a second hash H2. The method also includes storing the hash $H_1$, the first data chunk $C_1$, and the second hash $H_2$. The method also includes calculating, by using a hash function, a hash $H_1'$ for the data chunk $C_1$ and the second hash $H_2$, and, comparing the calculated hash $H_1'$ with the hash $H_1$. If the calculated hash $H_1'$ doesn't match the hash $H_1$, then, the method also includes generating an invalid signal to indicate that the first data chunk $C_1$ has been tampered with.

In some embodiments, when 1<i<n, the method may also include (1) retrieving a hash $H_i$, a data chunk $C_i$, and a next hash $H_{i+1}$ from the data stream, hash $H_i$ is the hash for a data chunk $C_i$ and a next hash $H_{i+1}$, (2) storing the hash $H_i$, the data chunk $C_i$, and the next hash $H_{i+1}$, (3) calculating, by using the hash function, a hash $H_i'$ for the data chunk $C_i$ and the next hash $H_{i+1}$, and (4), comparing the calculated hash $H_i'$ with the hash $H_i$. If the calculated hash $H_i'$ doesn't match the hash $H_i$, then, the method may also include generating an invalid signal to indicate that the data chunk $C_i$ has been tampered with.

In some embodiments, when i=n, the method may also include (1) retrieving and storing a hash $H_n$, and a data chunk $C_n$, the hash $H_n$ is the hash for the data chunk $C_n$, (2) calculating, by using the hash function, a hash $H_n'$ for the data chunk $C_n$, and (3) comparing the calculated hash $H_n'$ with the hash $H_n$. If the calculated hash $H_n'$ doesn't match the hash $H_n$, the method may also include generating an invalid signal to indicate the data chunk $C_n$ has been tampered with.

In some embodiments, the hash function may be a secure hash algorithm 3 (SHA-3). In some embodiments, the data chunks may include data used for configuring a block of programmable logic (PL). In some embodiments, if the calculated hash $H_1'$ matches the hash $H_1$, the method may also include loading the data chunk $C_1$ to configure the block of PL. In some embodiments the target device may be a system-on-chip (SOC). The $H_i$, $C_i$, and $H_{i+1}$ may be stored in off-chip memory or on-chip memory.

In another exemplary aspect, a circuit includes a memory configured to store at least a portion of a data stream for a target device, the data stream includes a signature S, n−1 hashes ($H_2$, $H_n$), and n data chunks ($C_1$, . . . , $C_n$), the signature S is the signature for a first hash $H_1$, the first hash $H_1$ is the hash for a first data chunk $C_1$ and a second hash $H_2$. A sub-processor is configured to retrieve the signature S and, when the signature S passes verification, extract the first hash $H_1$, the first data chunk $C_1$, and the second hash $H_2$ from the memory. A hash engine is configured to perform hash functions on the first data chunk $C_1$ and the second hash $H_2$ to generate a hash $H_1'$. A validation engine is configured to compare the retrieved hash $H_1$ with the generated hash $H_1'$. The validation engine is further configured to generate an invalid signal to indicate that the first data chunk $C_1$ has been tampered with if the generated hash $H_1'$ doesn't match the retrieved hash $H_1$.

In some embodiments, when 1<i<n, the memory may be further configured to store a hash $H_i$, a data chunk $C_i$, and a next hash $H_{i+1}$, the hash $H_i$ is the hash for a data chunk $C_i$ and a next hash $H_{i+1}$, the hash engine may be further configured to perform hash functions on the data chunk $C_i$ and the next hash $H_{i+1}$ to generate a hash $H_i'$, and, the validation engine may be further configured to compare the retrieved previous hash $H_i$ with the generated hash $H_i'$. If the generated hash $H_i'$ doesn't match the retrieved hash $H_i$, the validation engine may be further configured to generate an invalid signal to indicate that the data chunk $C_i$ has been tampered with.

In some embodiments, when i=n, the memory may be configured to store a hash $H_n$ and a data chunk $C_n$, the hash $H_n$ is the hash for the data chunk $C_n$. In some embodiments, the hash function may be a secure hash algorithm 3 (SHA-3). In some embodiments, the signature S may be generated by a Rivest-Shamir-Adleman Algorithm (RSA). In some embodiments, the target device may be a system-on-chip (SOC). In some embodiments, the n data chunks may include data used for configuring a block of programmable logic (PL). In some embodiments wherein the memory may be off-chip memory. In some embodiments, wherein, the memory may be on-chip memory. In some embodiments, wherein the size of each of the n data chunks may be programmable. In some embodiments, the sub-processor may be further configured to generate an invalid signal to indicate that the data stream is not from a valid source.

Various embodiments may achieve one or more advantages. For example, some embodiments may extend the use of hashes as a means to assure data integrity. Some embodiments may build the image from back to front, thus, hashes and/or data chunks may be read as needed from off-chip memory, rather than store the tables of hashes in on-chip memory. Thus, the consumption of on-chip memory or off-chip memory may be reduced. Some embodiments may reduce the authentication time by retrieving pre-calculated hash values in configuration image. Some embodiments may ensure data integrity and security by using encryption and decryption technology. Some embodiments may advantageously reduce the configuration time of programmable logic (PL) by authenticating and loading data chunks in the configuration image in sequence rather than authenticating and loading the whole data stream. Some embodiments may reduce the consumption of on-chip memory and keep the security of data by only loading three storage elements (e.g., data chunk $C_i$, hash $H_i$ and hash $H_{i+1}$) to the on-chip memory. In some embodiments, the size of data chunk $C_i$ may be variable to meet storage size of on-chip memory.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Apparatus and associated methods relate to authenticating a back-to-front-built configuration image. In an illustrative example, a circuit may include memory configured to store a signature S, a second hash $H_2$, and a first data chunk $C_1$. Signature S may be signed on a first hash $H_1$. $H_1$ may be the hash for $H_2$ and $C_1$. If signature S passes verification, a hash engine may perform hash functions on $C_1$ and $H_2$ to generate a hash $H_1'$. $H_1'$ may be compared with $H_1$ to indicate whether $C_1$ has been tampered with or not. By using incremental authentication, a signature that appears at the beginning of the image may be extended to the entire image while only using a small internal buffer. Advantageously, internal buffer may only need to store two hashes $H_i$, $H_{i+1}$, and a data chunk $C_i$, or, a signature S, a hash $H_i$, and a data chunk $C_i$.

To aid understanding, this document is organized as follows. An exemplary platform (e.g., an FPGA) suitable to perform incremental image authentication is briefly introduced with reference to FIG. 1. Second, with reference to FIGS. 2-5, the discussion turns to introduce the architecture of an authentication engine used to perform the incremental authentication, and the way to generate a configuration image that may be authenticated by the authentication engine. Finally, with reference to FIG. 6, the discussion discloses exemplary method to perform the authentication.

Figure 1:
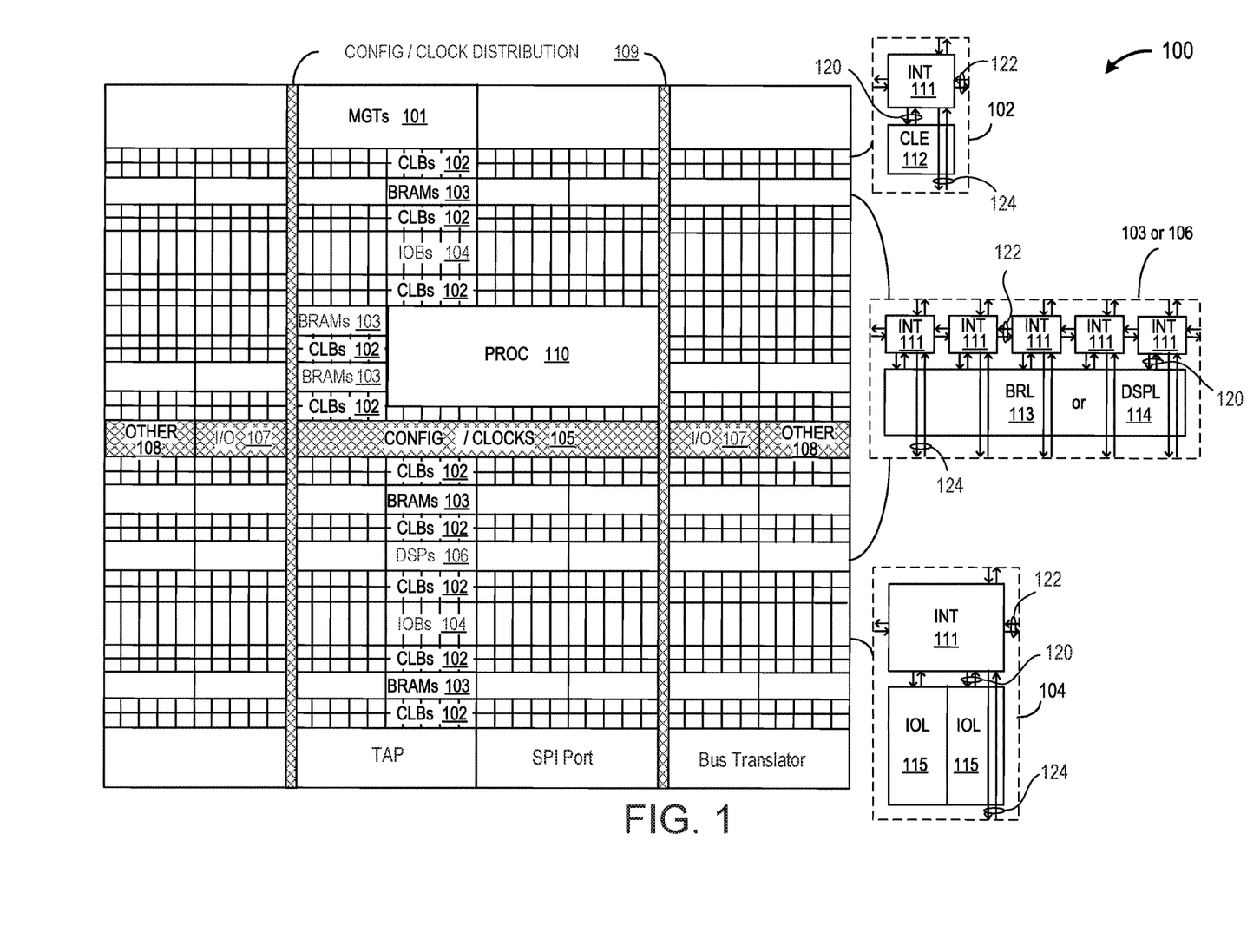
FIG. 1 depicts an exemplary programmable integrated circuit (IC) on which the disclosed circuits and processes may be implemented.

FIG. 1 depicts an exemplary programmable integrated circuit (IC) on which the disclosed circuits and processes may be implemented. A programmable IC 100 includes FPGA logic. The programmable IC 100 may be implemented with various programmable resources and may be referred to as a System on Chip (SOC). Various examples of FPGA logic may include several diverse types of programmable logic blocks in an array.

For example, FIG. 1 illustrates a programmable IC 100 that includes a large number of different programmable tiles including multi-gigabit transceivers (MGTs) 101, configurable logic blocks (CLBs) 102, blocks of random access memory (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., clock ports), and other programmable logic 108 (e.g., digital clock managers, analog-to-digital converters, system monitoring logic). The programmable IC 100 includes dedicated processor blocks (PROC) 110. The programmable IC 100 may include internal and external reconfiguration ports (not shown).

In various examples, a serializer/deserializer may be implemented using the MGTs 101. The MGTs 101 may include various data serializers and deserializers. Data serializers may include various multiplexer implementations. Data deserializers may include various demultiplexer implementations.

In some examples of FPGA logic, each programmable tile includes a programmable interconnect element (INT) 111 having standardized inter-connections 124 to and from a corresponding interconnect element in each adjacent tile. Therefore, the programmable interconnect elements taken together implement the programmable interconnect structure for the illustrated FPGA logic. The programmable interconnect element INT 111 includes the intra-connections 120 to and from the programmable logic element within the same tile, as shown by the examples included in FIG. 1. The programmable interconnect element INT 111 includes the inter-INT-connections 122 to and from the programmable interconnect element INT 111 within the same tile, as shown by the examples included in FIG. 1.

For example, a CLB 102 may include a configurable logic element (CLE) 112 that may be programmed to implement user logic, plus a single programmable interconnect element INT 111. A BRAM 103 may include a BRAM logic element (BRL) 113 and one or more programmable interconnect elements. In some examples, the number of interconnect elements included in a tile may depend on the height of the tile. In the pictured implementation, a BRAM tile has the same height as five CLBs, but other numbers (e.g., four) may also be used. A DSP tile 106 may include a DSP logic element (DSPL) 114 and one or more programmable interconnect elements. An IOB 104 may include, for example, two instances of an input/output logic element (IOL) 115 and one instance of the programmable interconnect element INT 111. The actual I/O bond pads connected, for example, to the I/O logic element 115, may be manufactured using metal layered above the various illustrated logic blocks, and may not be confined to the area of the input/output logic element 115.

In the pictured implementation, a columnar area near the center of the die (shown shaded in FIG. 1) is used for configuration, clock, and other control logic. Horizontal areas 109 extending from the column distribute the clocks and configuration signals across the breadth of the programmable IC 100. Note that the references to "columnar" and "horizontal" areas are relative to viewing the drawing in a portrait orientation.

Some programmable ICs utilizing the architecture illustrated in FIG. 1 may include additional logic blocks that disrupt the regular columnar structure making up a large part of the programmable IC. The additional logic blocks may be programmable blocks and/or dedicated logic. For example, the processor block PROC 110 shown in FIG. 1 spans several columns of CLBs 102 and BRAMs 103.

FIG. 1 illustrates an exemplary programmable IC architecture. The numbers of logic blocks in a column, the relative widths of the columns, the number and order of columns, the types of logic blocks included in the columns, the relative sizes of the logic blocks, and the interconnect/logic implementations are provided purely as examples. For example, in an actual programmable IC, more than one adjacent column of CLBs 102 may be included wherever the CLBs 102 appear, to facilitate the efficient implementation of user logic.

Figure 2:
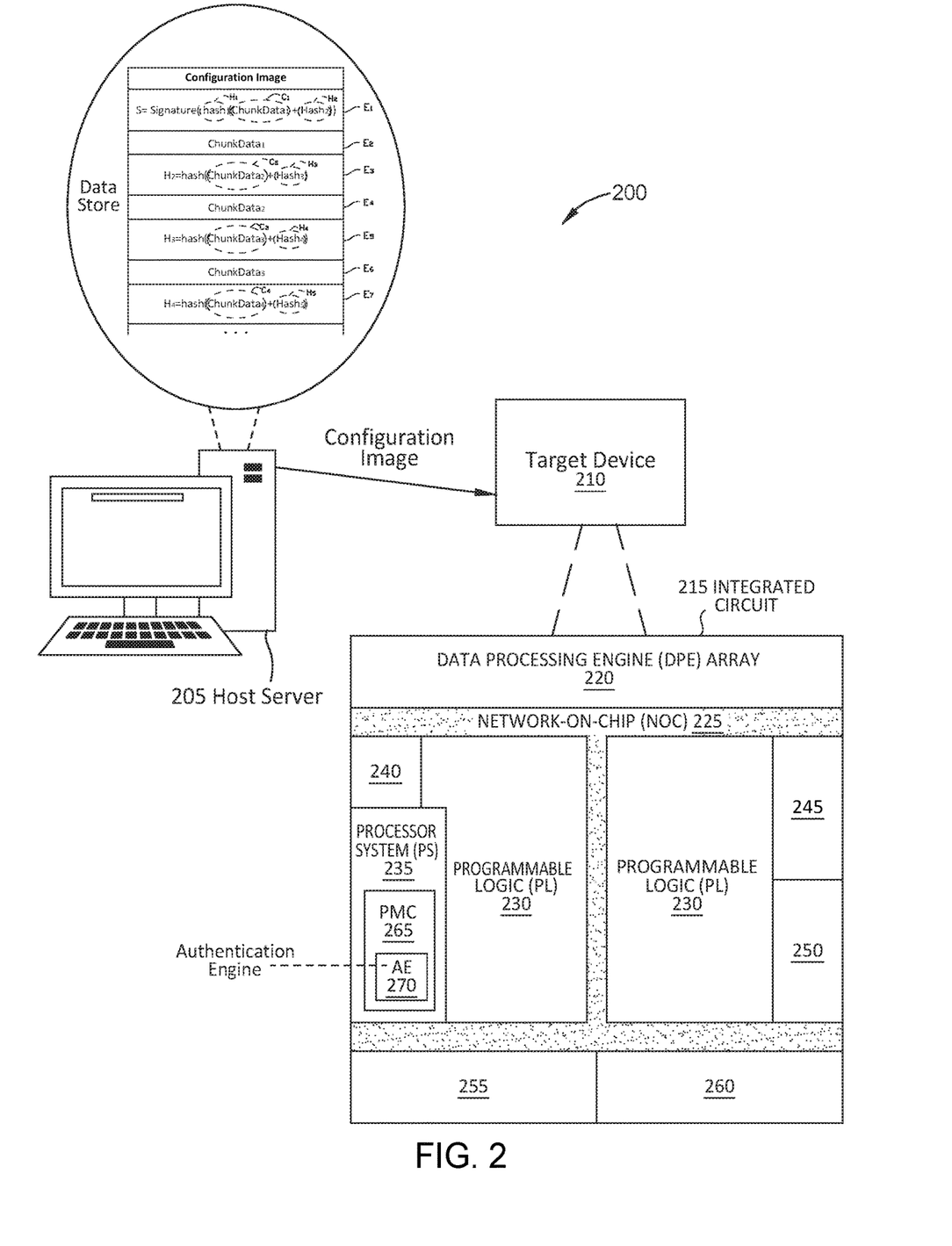
FIG. 2 depicts an exemplary system-on-chip (SOC) having an authentication engine.

Programmable logic (PL) and processor system (PS) may be integrated in a single chip to have comprehensive functions. The single chip may be implemented in communication systems, medical devices, and, vision technologies, for example. The PL may be configured by downloading or retrieving a configuration image or a configuration data stream to perform different functions. The downloaded or retrieved configuration image may be authenticated before loading the configuration image to the PL. When the configuration image or the configuration data stream is extremely large and the internal buffer (e.g., on-chip memory) is small, by extending the use of hashes as a means to assure data integrity on the hashes themselves and building the image from back to front, hashes and/or data chunks may be read as needed from off-chip memory, rather than store the tables of hashes in on-chip memory. An authentication engine may be used to check data integrity check and authenticate source of the data. An exemplary IC having an authentication engine is described in further detail with reference to FIG. 2A.

FIG. 2A depicts an exemplary system-on-chip (SOC) having an authentication engine. In this depicted example, system 200 includes a host server 205 (e.g., a general-purpose computer). The host server 205 may send data to a target device 210, for example. To ensure data integrity and security, the host server 205 may pre-process (e.g., hash, encrypt and/or digitally sign) the data of interest and store the pre-processed data in a data store of the host server 205. The re-processed data (e.g., configuration image) may be retrieved or received by the target device 210 and then checked by the target device 210.

In this depicted example, the target device 210 includes an integrated circuit (IC) 215 to perform some predetermined operations (e.g., data communications). IC 215 may also be used to perform data processing using separate circuits that are separately supplied by multiple power domains. IC 215 may be implemented as a System-on-Chip (SOC) type of device. In general, an SOC refers to an IC that includes two or more subsystems capable of interacting with one another. As an example, an SOC may include a processor that executes program code and one or more other circuits. The other circuits may be implemented as hardwired circuitry, programmable circuitry, other subsystems, and/or any combination thereof. The circuits may operate cooperatively with one another and/or with the processor. In this depicted example, an SOC includes a data processing engine (DPE) array 220. The DPE array 220 may include one or more DPEs. The DPE may include a math engine (ME), for example.

For purpose of illustration, the IC 215 includes a block of programmable logic (PL) 230. The PL 230 is circuitry that may be programmed to perform specified functions. As an example, PL 230 may be implemented as field programmable gate array (FPGA) circuitry. PL 230 may include an array of programmable circuit blocks. Examples of programmable circuit blocks within PL 230 include, but are not limited to, interconnect block, configurable logic blocks (CLBs), dedicated random access memory blocks (BRAM), digital signal processing blocks (DSPs), clock managers, and/or delay lock loops (DLLs). In the example of FIG. 2, PL 230 is shown in two separate sections. In another example, PL 230 may be implemented as a unified region of programmable circuitry. In still another example, PL 230 may be implemented as more than two different regions of programmable circuitry. The particular organization of PL 230 is not intended as a limitation. In some embodiments, the PL 230 may include some programmable circuit blocks. Each programmable circuit block within PL 230 may include both programmable interconnect circuitry and programmable logic circuitry. The programmable interconnect circuitry may include a large number of interconnect wires of varying lengths interconnected by programmable interconnect points (PIPs). The interconnect wires may be configured (e.g., on a per wire basis) to provide connectivity on a per-bit basis (e.g., where each wire conveys a single bit of information). The programmable logic circuitry implements the logic of a user design using programmable elements that may include, for example, look-up tables, registers, arithmetic logic, and so forth. The programmable interconnect and programmable logic circuitries may be programmed by loading configuration data into internal configuration memory cells that define how the programmable elements are configured and operate.

The IC 215 also includes a processor system (PS) 235 implemented as hardwired circuitry that is fabricated as part of IC 215. PS 235 may be implemented as, or include, any of a variety of different processor types. For example, PS 235 may be implemented as an individual processor, e.g., a single core capable of executing program code. In another example, PS 235 may be implemented as a multi-core processor. In still another example, PS 235 may include one or more cores, modules, co-processors, interfaces, and/or other resources. PS 235 may be implemented using any of a variety of different types of architectures. Example architectures that may be used to implement PS 235 may include, but are not limited to, an ARM processor architecture, an x86 processor architecture, RISC architectures, a GPU architecture, a mobile processor architecture, a DSP architecture, or other suitable architecture that is capable of executing computer-readable instructions or program code.

The IC 215 also includes subsystems, such as a network-on-chip (NOC) 225, and/or any of hardwired circuit blocks 240, 245, 250, 255, and/or 260. Through the NOC 225, one or more DPEs in the DPE array 220 may be capable of communicating with PS and/or hardwired circuit blocks 255 and 260. In some embodiments, the hardwired circuit blocks 255 and 260 may include I/Os (e.g., extended performance I/Os (XPIOs) 256) or memory controllers (MCs), for example. In some embodiments, one or more DPEs in the DPE array 220 may capable of communicating with hardwired circuit blocks 240, 245, 250 via a system-on-chip (SOC) interface block and PL 230. In some embodiments, the SOC interface block may be coupled directly to one or more subsystems of the IC 215. For example, SOC interface block may be coupled directly to PS 235 and/or to other hardwired circuit blocks. In particular embodiments, hardwired circuit blocks 240-260 may be considered examples of ASICs.

For purpose of explanation, the host server 205 may send data chunks to configure the PL 230. To ensure data integrity and security, and to advantageously decrease the consumption of on-chip memory, the host server 205 may pre-process the data chunks to form a configuration image. The PS 235 sends the configuration image to configure the PL 230 in the IC 215. The PS 235 may be responsible for loading the configuration image to the PL 230. The configuration image may be large relative to the size of available on-chip memory buffers. Thus, storage elements in the configuration image may be sequentially retrieved and checked by the target device 210. An example of a configuration image is described in further detail with reference to FIG. 3A.

In this depicted example, PS 235 includes a platform management controller (PMC) 265. PMC 265 may be designed to take care of power management (e.g., power-up/down, resets, isolations, IRO clocking). In this depicted example, the PMC 265 includes an authentication engine (AE) 270 to take care of the security of the IC 215 (e.g., authenticating the received configuration image to be used to configure the PL 230). An example of an AE is described in detail with reference to FIG. 5.

Although in this depicted example, the AE 270 is arranged in the PMC 265, in various embodiments, some or all of the functions of the AE 270 may be implemented in a different place (e.g., in the programmable logic PL).

In some embodiments, the AE 270 may be implemented as hard block fixed circuitry. For example, an application specific integrated circuit (ASIC) may provide an AE for authenticating the received data of interest.

In some embodiments, some or all of the functions of the AE 270 may be implemented in a processor (e.g., the PS 235) that is configured to execute a set of instructions stored in a data store to control the authentication of the received data of interest. The processor and the data store may be arranged on the same integrated circuit 215 with the PL 230. In some embodiments, the processor and the data store may be implemented in a programmable logic block (e.g., the PL 230) of a system-on-chip (SOC) or implemented in a hard block using fixed circuitry of the SOC.

Figure 3A:
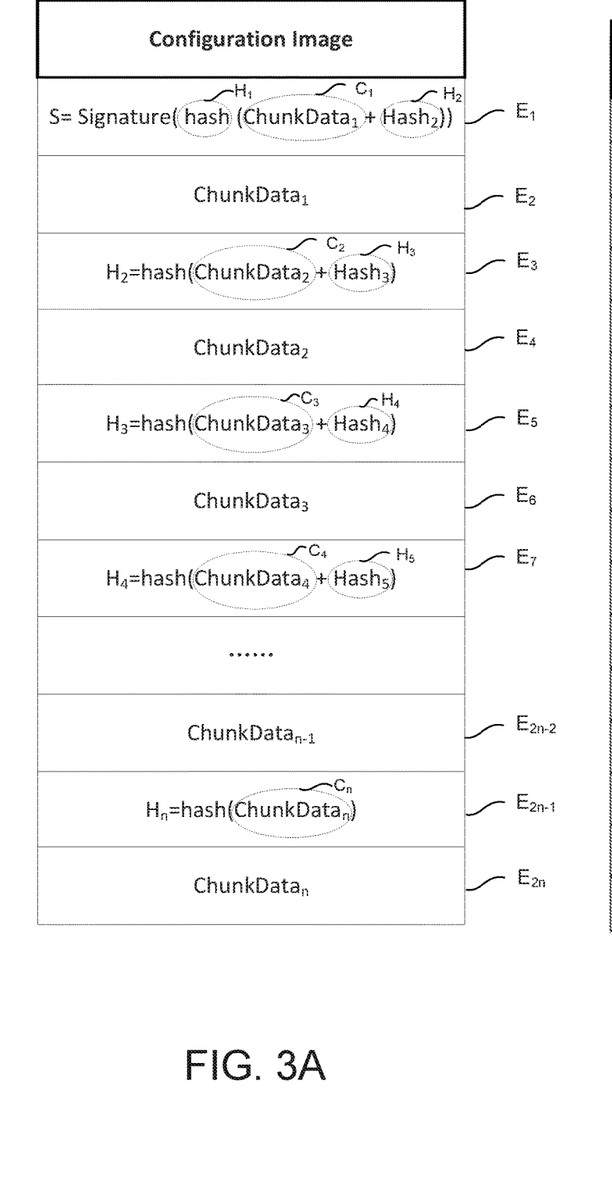
FIG. 3A depicts an exemplary configuration image to be authenticated by the authentication engine.

FIG. 3A depicts an exemplary configuration image to be authenticated by the authentication engine. In this depicted example, the configuration data stream is divided into a series of non-overlapping data chunks (e.g., n data chunks $C_1, \ldots C_n$). The chunks may be sent out and received independently of one another. In this depicted example, the configuration image includes 2n storage elements (e.g., $E_1, \ldots, E_{2n}$).

When i=1, the first storage element $E_1$ of the configuration image is a signature S of a first hash $H_1$. The first hash $H_1$ is the hash for a first data chunk C and a second hash $H_2$. The signature S may be generated by running the first hash $H_1$ and a private key through a signing algorithm. The signing algorithm may be Rivest-Shamir-Adleman Algorithm (RSA) or Elliptic Curve Digital Signature Algorithm (ECDSA). Thus, the first storage element $E_1$ (e.g., the signature S) may be used to verify the source of the n data chunks $C_1, \ldots C_n$. The signature S, appearing at the beginning of the image, may be extended to the entire image.

Although in this depicted example, the first storage element $E_1$ is the signature S, in some embodiments, the first storage element $E_1$ may be the first hash $H_1$. Another exemplary configuration image is discussed in further detail with reference to FIG. 3C.

Each odd storage element $E_{2i-1}$ in the configuration image is a hash $H_i$ or a signature S. Each even storage element $E_{2i}$ in the configuration image is a data chunk $C_i$. The $(2i)^{th}$ storage element $E_{2i}$ is the data chunk $C_i$. The $(2i-1)^{th}$ storage element $E_{2i-1}$, the $(2i)^{th}$ storage element $E_{2i}$, the $(2i+1)^{th}$ storage element $E_{2i+1}$ may be used to authenticate the data chunk $C_i$. For example, the third storage element $E_3$ of the configuration image is the second hash $H_2$ for the second data chunk $C_2$ and a third hash $H_3$. The first three storage elements $E_1$, $E_2$, and $E_3$ may be used to authenticate the first data chunk $C_1$. For example, the $E_2$ and $E_3$ may be sent to a hash engine to calculate a message digest S'. The message digest S' may be compared with the signature S (i.e., $E_1$) to identify whether the first data chunk $C_1$ has been tampered with or not.

When $2 \leq i \leq n-1$, each data chunks $C_i$ includes corresponding data in its corresponding data chunk $C_i$, and each hash $H_i$ is the hash for a corresponding data chunk $C_i$ and its next hash $H_{i+1}$. For example, hash $H_4$ is the hash for a corresponding data chunk $C_4$ and its next hash $H_5$.

When i=n, the last hash $H_n$ is the hash for data chunk $C_n$ and may not contain a hash for the next data chunk as there are no more data chunks. In some embodiments, the last hash $H_n$ may be the hash for the last data chunk $C_n$ and a hash $H_{n+1}$. In some implementations, the hash $H_{n+1}$ may, for example, be specified as empty. The last storage element $E_{2n}$ is the last data chunk $C_n$. In some embodiments, the size of each chunk may be variable and programmable. In some embodiments, the size of each chunk may be selected based on the size of the on-chip memory. The size of each chunk may be, for example, 32 kilobytes. Each data chunk may include one or more message blocks, based on the size of each data chunk and the size of message blocks.

When the configuration data stream is extremely large and the on-chip memory is small, by extending the use of hashes as a means to assure data integrity on the hashes themselves and building the image from back to front, hashes and/or data chunks may be read as needed from off-chip memory, rather than store the tables of hashes in on-chip memory. In some embodiments, when on-chip memory has enough space, the hashes and/or the data chunks may be stored in the on-chip memory. The on-chip memory may include a random-access-memory (RAM), for example.

Figure 3B:
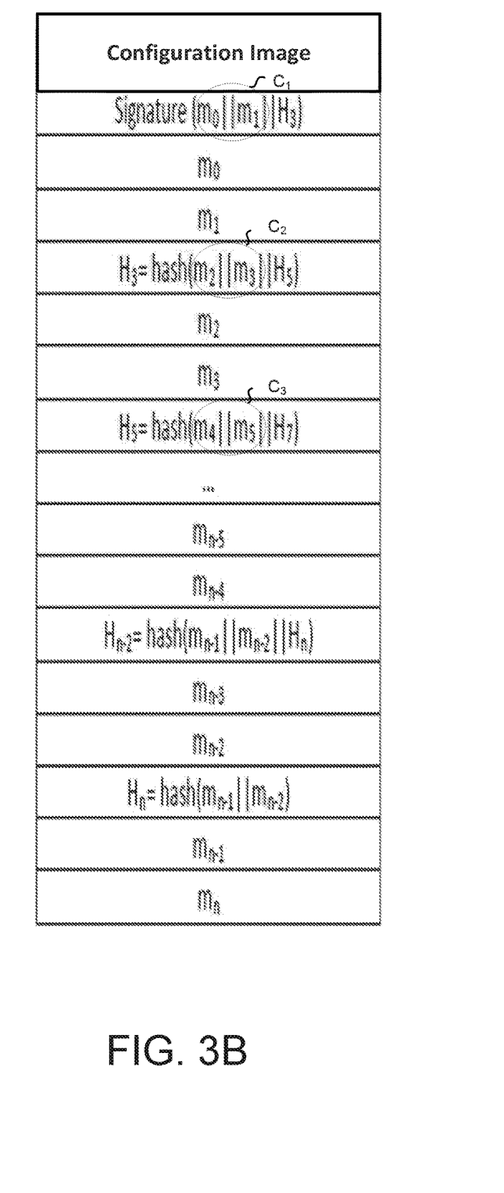
FIG. 3B depicts another exemplary configuration image to be authenticated by the authentication engine.

FIG. 3B depicts another exemplary configuration image to be authenticated by the authentication engine. In this depicted example, each data chunk includes two message blocks. For example, the first data chunk $C_1$ includes message block $m_0$ and message block $m_1$. The first storage element of the configuration image is the signature S of the first data chunk $C_1$ and the hash $H_3$. Hash $H_3$ is the hash for the second data chunk $C_2$ and the hash $H_5$. The second data chunk $C_2$ includes message block $m_2$ and message block $m_3$. Hash $H_5$ is the hash for the third data chunk $C_3$ and hash $H_7$, etc. The configuration image is built from back to front. In some embodiments, each data chunk $C_i$ may include different numbers of message blocks, depends on the size of each of the message blocks. An exemplary method to build the configuration image in FIG. 3A is described in further detail with reference to FIG. 4A, and an exemplary flow to build the exemplary configuration image in FIG. 3B is described in further detail with reference to FIG. 4B.

In some embodiments, the data chunks through $C_1$ to $C_{n-1}$ may be always completely filled. Within each chunk, the hash may be first appended to the final block of a chunk and then padding may be applied. Prevention of length extension attacks may require additional checks, such as ensuring each block is full, that the additional hash and padding are inserted at the proper positions, or that the length of the message block is correct.

Figure 3C:
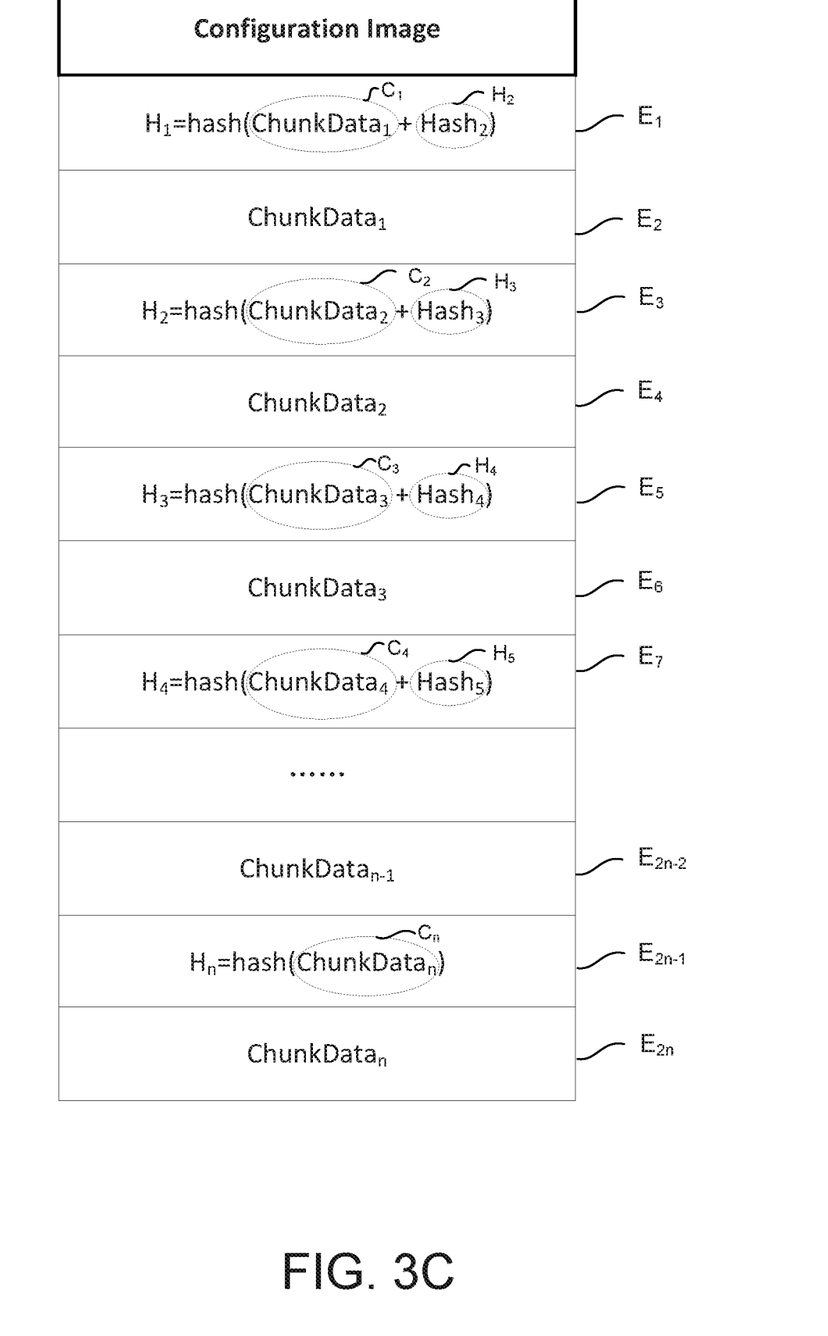
FIG. 3C depicts another exemplary configuration image to be verified by the authentication engine.

FIG. 3C depicts another exemplary configuration image to be verified by the authentication engine. In this depicted example, the configuration image also includes 2n storage elements ($E_1$, $E_2$, $E_{2n}$). The first storage element $E_1$ is a first hash $H_1$. The first hash $H_1$ is the hash for a first data chunk $C_1$ and a second hash $H_2$. The first storage element $E_1$ may be calculated by running the first data chunk $C_1$ and the second hash $H_2$ through a hash algorithm. The hash algorithm may include a secure hash algorithm 2 (SHA-2), a secure hash algorithm 3 (SHA-3), or a secure hash algorithm 4 (SHA-4). Thus, the first storage element $E_1$ (e.g., the first hash $H_1$) may be used to verify the integrity of the n data chunks $C_1, \ldots C_n$. Thus, the first hash $H_1$, appearing at the beginning of the image, may be extended to the entire image.

Figure 4A:
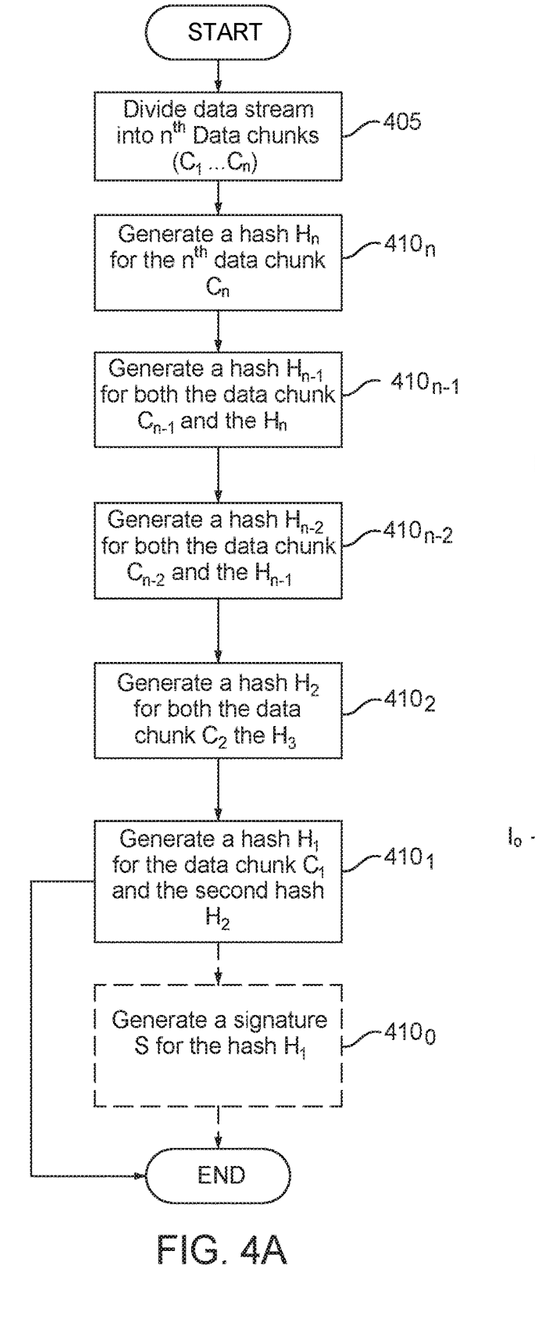
FIG. 4A depicts an exemplary method to build the exemplary configuration image in FIG. 3A.

FIG. 4A depicts an exemplary method to build the exemplary configuration image in FIG. 3A. In the host server 205, a processor may be used to execute a set of instructions. At 405, the processor divides the configuration data stream into n data chunks (e.g., $C_1, \ldots C_n$). The configuration image is then built from back to front. More specifically, the processor may introduce a variable i and initialize i=n. When i=n, at 410$_n$, the processor sends the $n^{th}$ data chunk $C_n$ to run through a hash function (e.g., a SHA-3 hashing algorithm) to produce the hash $H_n$ for the $n^{th}$ data chunk $C_n$. The $n^{th}$ data chunk $C_n$ may be the $(2n)^{th}$ storage element of a configuration image (e.g., the configuration image in FIG. 3A). The hash $H_n$ may be the $(2n-1)^{th}$ storage element of the configuration image.

The processor then may decrement the variable n. When $2 \leq i < n$, the processor sends each data chunk $C_i$ and the generated hash $H_{i+1}$ to run through the hash function to produce the hash $H_i$. For example, at 410$_{n-1}$, the processor sends the $(n-1)^{th}$ data chunk $C_{n-1}$ and the hash $H_n$ to run through the hash function to produce the hash $H_{n-1}$ for the $(n-1)^{th}$ data chunk $C_{n-1}$ and the hash $H_n$. At 410$_{n-2}$, the processor sends the $(n-2)^{th}$ data chunk $C_{n-2}$ and the hash $H_{n-1}$, etc. When n=2, At 410$_2$, the processor sends the second data chunk $C_2$ and the hash $H_3$ to run through the hash function to produce the hash $H_2$.

When i=1, at 410$_1$, the processor sends the first data chunk $C_1$ and the second hash $H_2$ to run through the hash function to produce a first hash $H_1$ for the first data chunk $C_1$ and the second hash $H_2$. In some embodiments, the first hash $H_1$ may be the first storage element $E_1$ of the configuration image. In some embodiments, at 410$_0$, a signature S may be then generated for the hash $H_1$. The signature S may be the first storage element $E_1$ of the configuration image. The signature S may be calculated by using a signing algorithm (e.g., RSA or ECDSA) to sign the first hash $H_1$. In some embodiments, the first hash $H_1$ and a private key may be directly run through a signing algorithm (e.g., RSA or ECDSA) to generate the signature S. A public key may be given to the target device 210 and the target device 210 may use the public key to verify whether the image was signed with the private key. At the end of the method, the configuration image is built, each hash $H_i$ is the hash for a data chunk $C_i$ and a next hash $H_{i+1}$.

Figure 4B:
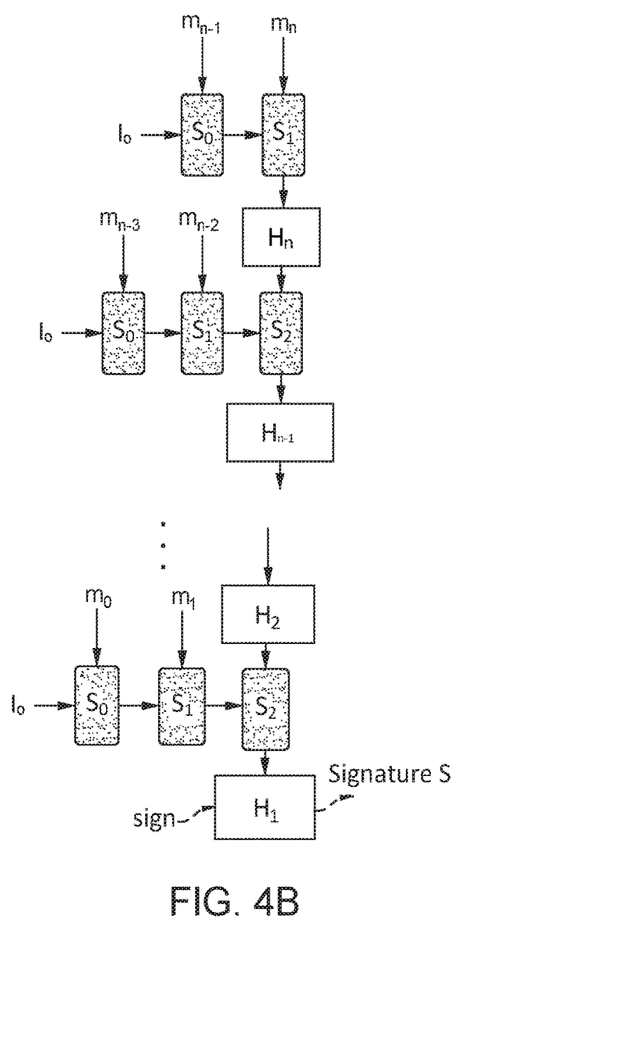
FIG. 4B depicts an exemplary flow to build the exemplary configuration image in FIG. 3B.

FIG. 4B depicts an exemplary flow to build the exemplary configuration image in FIG. 3B. In this depicted example, each data chunk includes two message blocks. For example, the $n^{th}$ data chunk $C_n$ includes a message block $m_n$ and message block $m_{n-1}$. The message block $m_n$ and message block $m_{n-1}$ are sent to a hash engine to generate the $n^{th}$ hash $H_n$. $S_0$, $S_1$, $S_2$ are, for example, 1600-bit internal state of a hash engine (e.g., a SHA-3 hash algorithm). All subsequent data chunks includes more message blocks. For example, the $n^{th}$ hash $H_n$, message block $m_{n-2}$, and message block $m_{n-3}$ are sent to the hash engine to generate the $(n-1)^{th}$ hash $H_{n-1}$. In this depicted example, the internal hash state of the hash engine is continual re-initialized with the initial state as a matter of convenience to build the configuration image. The first hash $H_1$ may be signed or not to be used as the first storage element $E_1$. When all hashes (and the signature S) are obtained, the configuration image may be built. And the configuration image may be sequentially sent to the authentication engine of the target device 210.

Figure 5:
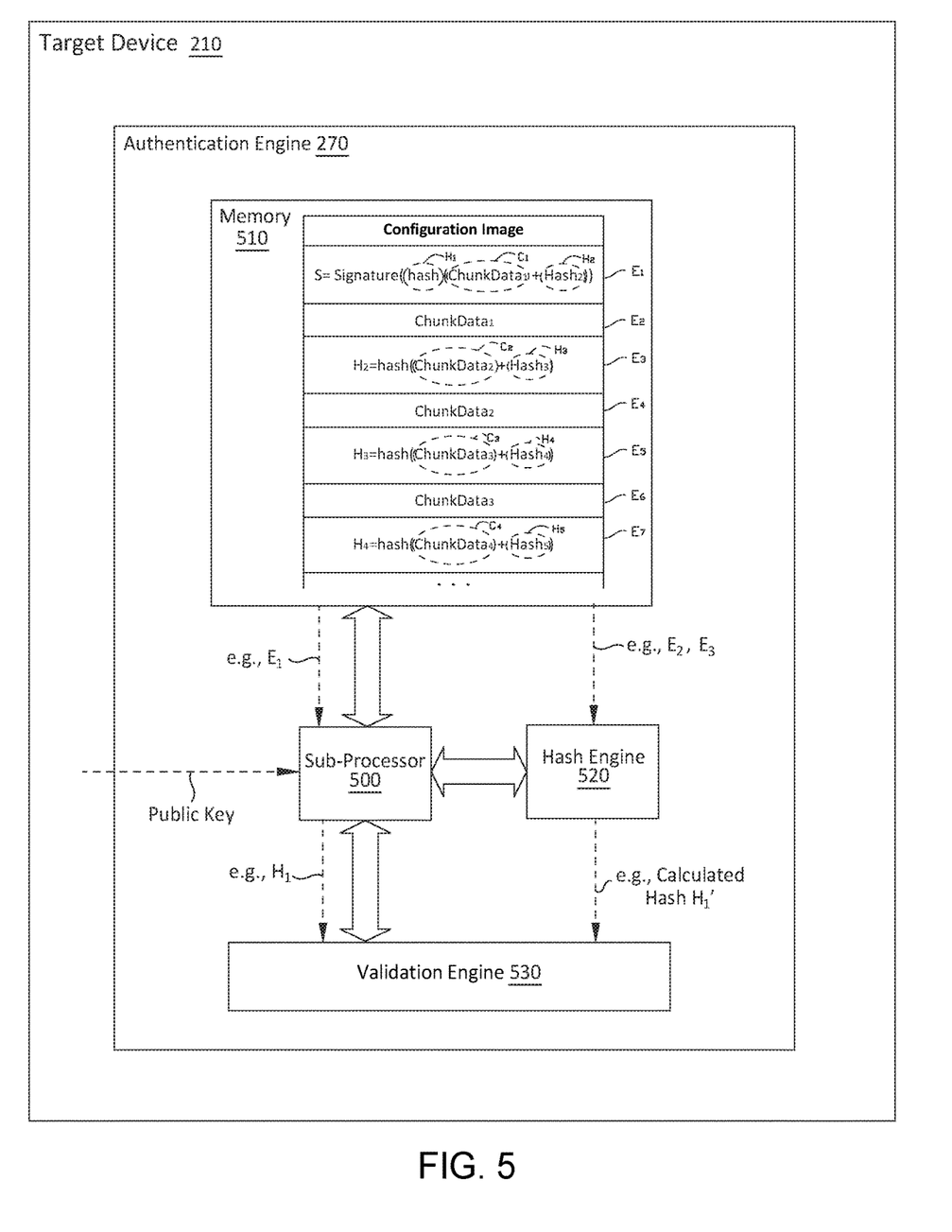
FIG. 5 depicts an architecture of the exemplary authentication engine.

FIG. 5 depicts an architecture of the exemplary authentication engine. In this depicted example, the authentication engine 270 includes a sub-processor 500 configured to perform predetermined operations. For example, the sub-processor 500 may determine whether to retrieve the storage elements in the configuration image to memory 510. Memory 510 may be off-chip memory or on-chip memory. In some embodiments, when the first storage element $E_1$ is the signature S, the sub-processor 500 may also be configured to compare whether a public key in the possession of the target device 210 matches a private key used to generate the signature S. If the public key matches the private key, then the sub-processor 500 may be able to extract the hash $H_1$, for example. If the public key doesn't match the private key, then, the sub-processor 500, for example, may generate an invalid signal to indicate that the data stream is not from a valid source (e.g., actual sender of the data stream is not the expected sender).

In some embodiments, the size of memory 510 may be constrained. The sub-processor 500 may instruct memory 510 to retrieve, each time, a data chunk and two hashes (e.g., $C_3$, $H_2$, $H_3$), or a signature, a data chunk and a hash (e.g., S, $C_1$, $H_2$) from the host server 205 as needed. Memory 510 may only need to store three storage elements (e.g., store $E_1$, $E_2$, and $E_3$, or store $E_3$, $E_4$, and $E_5$). The authentication engine 270 also includes a hash engine 520 operably connected to the sub-processor 500. The hash engine 520 may include the same hash algorithm (e.g., SHA-3 hash algorithm) used by the host server 205 when building the configuration image. The sub-processor 500 may instruct the hash engine 520 to retrieve data chunk $C_i$ and hash $H_{i+1}$ from memory 510 and perform hash functions on the retrieved data chunk $C_i$ and hash $H_{i+1}$ to generate hash $H_i'$.

The authentication engine 270 also includes a validation engine 530 operably coupled to the sub-processor 500. The sub-processor 500 may instruct the validation engine 530 to retrieve pre-calculated hash $H_i$ or signature S from memory 510. The sub-processor 500 may instruct the validation engine 530 to compare the generated hash value $H_i'$ with the pre-calculated hash $H_i$. The sub-processor 500 may execute some predetermined instructions based on the comparison result. For example, when the generated hash $H_i'$ doesn't match the pre-calculated hash $H_i$, the sub-processor 500 may return this comparison result to a user and indicate the data chunk $C_i$ may have been tampered with. When the generated hash $H_i'$ matches the pre-calculated hash $H_i$, the sub-processor 500 may process (e.g., decrypt) the data chunk $C_i$ and load it to the PL 230. In some embodiments, some or all of the functions of the validation engine 530 may be implemented in the sub-processor 500.

In some embodiments, the target device 210 may include a large size memory. The large size memory may be used to buffer the whole configuration image. The sub-processor 500 may instruct each of the hash engine 520 and the validation engine 530 to retrieve corresponding storage elements. The data chunks may be then sequentially authenticated.

Figure 6:
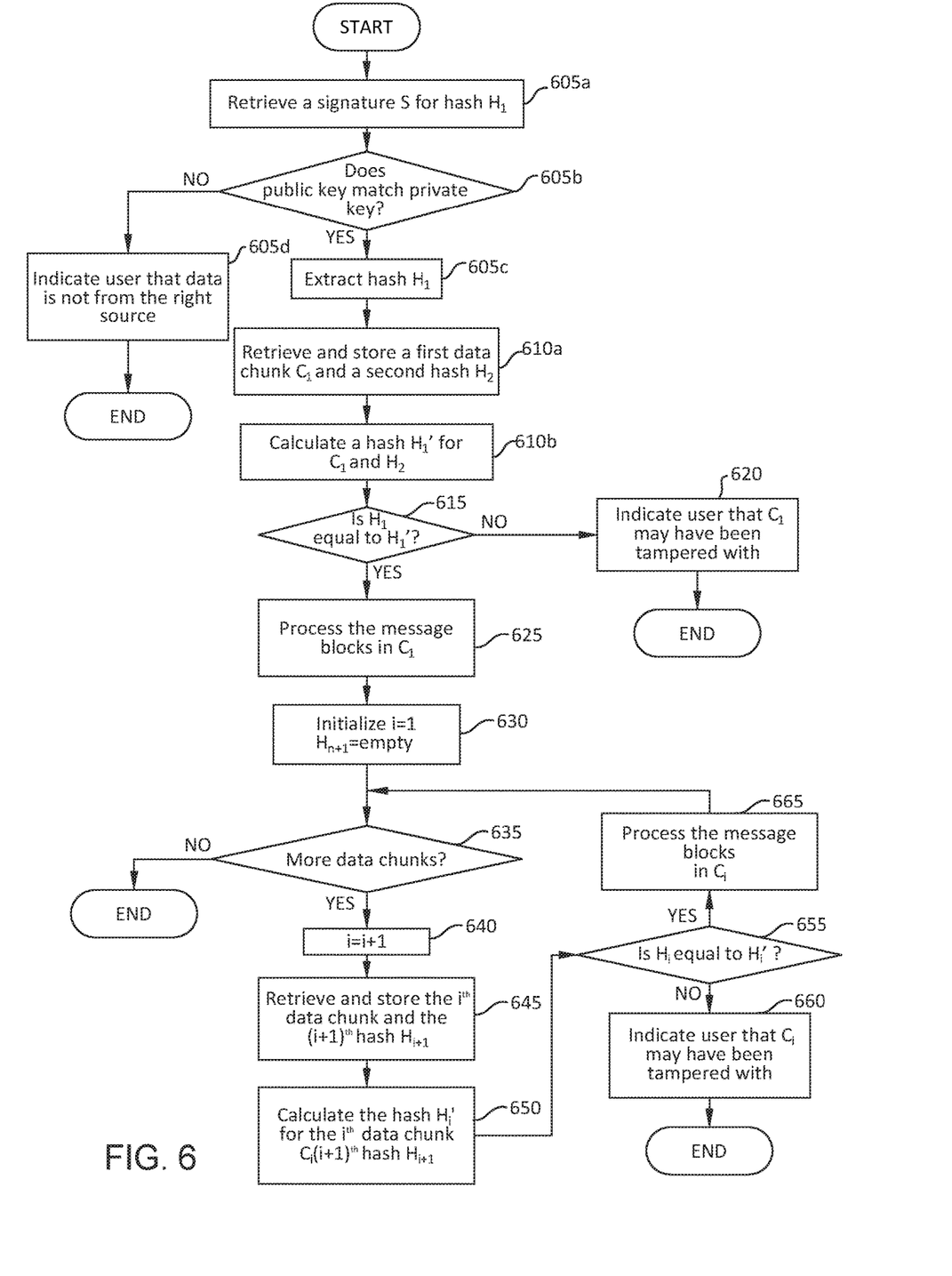
FIG. 6 depicts a flow chart of an exemplary method to verify the integrity and authenticity of the configuration image.

FIG. 6 depicts a flow chart of an exemplary method to verify the integrity and authenticity of the configuration image. In this depicted example, a first storage element is a signature S. A method 600 includes, at 605a, retrieving a signature S for a hash $H_1$. Hash $H_1$ is the hash for a first data chunk $C_1$ and a second hash $H_2$. The method 600 also includes verifying the signature S, at 605b, a sub-processor (e.g., the sub-processor 500) compares whether a public key in the possession of a target device (e.g., the target device 210) matches a private key used to generate the signature S. If the public key matches the private key, then, the sub-processor 500 extracts the hash $H_1$. If the public key doesn't match the private key, then, at 605d, the sub-processor 500 indicates that data is not from the valid source or the right source (e.g., actual sender is not the expected sender).

At 610a, the sub-processor 500 retrieves or receives, and store the first data chunk $C_1$ and a second hash $H_2$. At 610b, a hash engine (e.g., the hash engine 520) calculates a hash $H_1'$ for the first data chunk $C_1$ and the second hash $H_2$. At 615, a validation engine (e.g., the validation engine 530) compares whether the calculated hash $H_1'$ matches the hash $H_1$. If hash $H_1'$ doesn't match hash $H_1$, then, at 620, the sub-processor 500 indicates the user that the first data chunk $C_1$ may be have been tampered with. In another embodiments, when the first storage element is the first hash $H_1$, the method 600 may directly retrieve the first hash $H_1$ and omit operations 605a, 605b, 605c, and 605d.

If hash $H_1'$ matches hash $H_1$, then, at 625, the sub-processor 500 processes message blocks in the data chunk $C_1$. At 630, the sub-processor 500 introduces a variable i and initialize i=1, and specifies a hash $H_{n+1}$ as empty, n is the number of data chunks. At 635, the sub-processor determines whether the received data of interest has more data chunks. If no, then, the method ends. If yes, then, at 640, the sub-processor 500 increments the variable i. At 645, the sub-processor 500 retrieves and store the $i^{th}$ data chunk $C_1$ and the $(i+1)^{th}$ hash $H_{i+1}$. At 650, the hash engine 520 calculates the $i^{th}$ hash $H_i'$ for the $i^{th}$ data chunk $C_i$ and the $(i+1)^{th}$ hash $H_{i+1}$. At 655, the validation engine 530 compares whether the calculated $H_i'$ matches the retrieved $H_i$. If $H_i'$ doesn't match $H_i$, then, at 660, the sub-processor 500 indicates the user that the data chunk $C_i$ may be have been tampered with. If $H_i'$ matches $H_i$, then, at 665, the sub-processor 500 processes message blocks in the data chunk $C_i$. The method loops back to 635 until there are no more data chunks of interest. The last hash $H_n$ is the hash for the last data chunk $C_n$. In some embodiments, the last hash $H_n$ may be the hash for the last data chunk $C_n$ and a hash $H_{n+1}$. In some implementations, the hash $H_{n+1}$ may, for example, be specified as empty.

For example, at step 645, the sub-processor 500 retrieves the second data chunk $C_2$ and the third hash $H_3$. At 650, the hash engine 520 calculates the second hash $H_2'$ for the second data chunk $C_2$ and the third hash $H_3$. At 655, the validation engine 530 compares whether the calculated $H_2'$ matches the retrieved $H_2$ (retrieved at 605). If $H_2'$ doesn't match $H_2$, then, at 660, the sub-processor 500 indicates the user that the second data chunk $C_2$ may be have been tampered with. If $H_2'$ matches $H_2$, then, at 665, the sub-processor 500 processes message blocks in the data chunk $C_2$.

Thus, at most two hash values (e.g., the current hash and the next hash) and at most one data chunk (e.g., the current data chunk) may need to be stored in memory, regardless the total size of the configuration image. The size of the data chunk may be configurable. Thus, the consumption of memory may advantageously be reduced.

Although various embodiments have been described with reference to the figures, other embodiments are possible. For example, encryption and decryption may also be used to further improve the security of the data of interest.

Suitable processors for the execution of a program of instructions include, by way of example and not limitation, both general and special purpose microprocessors, which may include a single processor or one of multiple processors of any kind of computer. Generally, a processor or a sub-processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices. The processor and memory can be supplemented by, or incorporated in, ASICs (application-specific integrated circuits). In some embodiments, the processor and memory can be supplemented by, or incorporated in hardware programmable devices, such as FPGAs, for example.

Various examples may be implemented using circuitry, including various electronic hardware. By way of example and not limitation, the hardware may include transistors, resistors, capacitors, switches, integrated circuits and/or other devices. In various examples, the circuits may include analog and/or digital logic, discrete components, traces and/or memory circuits fabricated on a silicon substrate including various integrated circuits (e.g., FPGAs, ASICs). In some embodiments, the circuits may involve execution of preprogrammed instructions and/or software executed by a processor. For example, various systems may involve both hardware and software.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a fixed hardware processor; and methods can be performed by a programmable processor executing a program of instructions to perform functions of various embodiments by operating on input data and generating an output. Some embodiments may be implemented advantageously in one or more computer programs that are executable on a programmable system including at least one processor coupled to receive data and instructions from, and to transmit data and instructions to, a data store, at least one input, and/or at least one output. A data store may include one or more registers or memory locations in, for example, a memory space. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other units suitable for use in a computing environment.

In various embodiments, a computer system may include non-transitory memory. Memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A method comprising:
receiving a signature from a data stream for a target device, wherein the data stream comprises the signature, a plurality of pre-calculated hashes, and a plurality of data chunks,
verifying the signature, and
if the signature passes verification, then:
extracting a first hash from the signature, wherein the first hash is a hash for a first data chunk of the plurality of data chunks and a second hash, wherein the second hash is one of the plurality of pre-calculated hashes;
storing the first hash, the first data chunk of the plurality of data chucks, and the second hash;
calculating, by using a hash function, a third hash based on the first data chunk of the plurality of data chunks and the second hash;
comparing the third hash with the first hash for a match between the first hash and the third hash; and,
if the third hash does not match the first hash, then, generating an invalid signal to indicate that the first data chunk has been tampered with;
retrieving a fourth hash, a second data chunk of the plurality of data chunks, and a fifth hash from the data stream, wherein the fourth hash is one of the pre-calculated hashes and is a corresponding hash for the second data chunk of the plurality of data chunks and the fifth hash, and wherein the fifth hash is one of the plurality of pre-calculated hashes;
storing the fourth hash, the second data chunk of the plurality of data chunks, and the fifth hash;
calculating, by using the hash function, a sixth hash based on the second data chunk of the plurality of data chunks and the fifth hash;
comparing the sixth hash with the fourth hash for a match between the fourth hash and the sixth hash; and,
if the sixth hash does not match the fourth hash, then, generating an invalid signal to indicate that the second data chunk has been tampered with.

2. The method of claim 1, further comprising:
retrieving and storing a seventh hash, and a second data chunk of the plurality of data chunks, wherein the seventh hash is one of the plurality of pre-calculated hashes and is a corresponding hash for the second data chunk;
calculating, by using the hash function, a eighth hash the second data chunk;

comparing the eighth hash with the seventh hash for a match between the seventh hash and the eighth hash; and, if the eighth hash does not match the seventh hash, then, generating an invalid signal to indicate the second data chunk has been tampered with.

3. The method of claim 1, wherein, the signature is generated by a Rivest-Shamir-Adleman Algorithm (RSA).

4. The method of claim 1, further comprising: if the signature does not pass the verification, then, generating an invalid signal to indicate that the data stream is not from a valid source.

5. A method comprising:
receiving a first hash from a data stream for a target device, wherein the data stream comprises a plurality of pre-calculated hashes and a plurality of data chunks, wherein the first hash is one of the plurality of pre-calculated hashes and is a hash for a first data chunk of the plurality of data chunks and a second hash, wherein the second hash is one of the plurality of pre-calculated hashes;
storing the first hash, the first data chunk of the plurality of data chunks, and the second hash;
calculating, by using a hash function, a third hash based on the first data chunk of the plurality of data chunks and the second hash;
comparing the third hash with the first hash for a match between the first hash and the third hash;
if the third hash does not match the first hash, then, generating an invalid signal to indicate that the first data chunk of the plurality of data chunks has been tampered with;
retrieving and storing a fourth hash, and a second data chunk, wherein the fourth hash is one of the plurality of pre-calculated hashes and is a corresponding hash for the second data chunk;
calculating, by using the hash function, a fifth hash based on the second data chunk;
comparing the fifth hash with the fourth hash for a match between the fourth hash and the fifth hash, and
if the fifth hash does not match the fourth hash, then, generating an invalid signal to indicate the second data chunk has been tampered with.

6. The method of claim 5, further comprising:
retrieving a seventh hash, a second data chunk of the plurality of data chunks, and a eighth hash from the data stream, wherein the seventh hash is one of the pre-calculated hashes and is a corresponding hash for the second data chunk of the plurality of data chunks and the eighth hash, wherein the eighth hash is one of the plurality of pre-calculated hashes;
storing the seventh hash, the second data chunk of the plurality of data chunks, and the eighth hash;
calculating, by using the hash function, a ninth hash based on the second data chunk of the plurality of data chunks and the eighth hash;
comparing the ninth hash with the fourth hash for a match between the fourth hash and the ninth hash; and,
if the ninth hash does not match the seventh hash, then, generating an invalid signal to indicate that the second data chunk of the plurality of data chunks has been tampered with.

7. The method of claim 5, wherein, the hash function comprises a secure hash algorithm 3 (SHA-3).

8. The method of claim 5, wherein, the target device comprises a system-on-chip (SOC).

9. A circuit comprising:
a memory configured to store at least a portion of a data stream for a target device, the data stream comprises a signature, a plurality of hashes, and a plurality of data chunks, wherein the signature is a signature for a first hash, wherein the first hash is a hash for a first data chunk of the plurality of data chunks and a second hash, wherein the second hash is one of the plurality of hashes;
a sub-processor configured to retrieve the signature and, when the signature passes verification, extract the first hash, the first data chunk, and the second hash from the memory;
a hash engine configured to perform a hash function on the first data chunk and the second hash to generate a third hash; and,
a validation engine configured to compare the retrieved first hash with the third hash,
wherein the validation engine is further configured to generate an invalid signal to indicate that the first data chunk has been tampered with if the third hash does not match the retrieved first hash;
wherein the memory is further configured to store a fourth hash, a second data chunk of the plurality of data chunks, and a fifth hash, wherein the fourth hash is one of the plurality of hashes and is a hash for a second data chunk and the fifth hash, and wherein the fifth hash is one of the plurality of hashes;
wherein the hash engine is further configured to perform the hash function on the second data chunk and the fifth hash to generate a sixth hash;
wherein the validation engine is further configured to compare the fourth hash with the sixth hash; and,
wherein if the sixth hash does not match the fourth hash, the validation engine is further configured to generate an invalid signal to indicate that the second data chunk has been tampered with.

10. The circuit of claim 9, wherein the memory is configured to store a seventh hash and a second data chunk, wherein the seventh hash is one of the plurality of hashes and is a hash for the second data chunk.

11. The circuit of claim 9, wherein, when the signature does not pass the verification, the sub-processor is further configured to generate an invalid signal to indicate that the data stream is not from a valid source.

12. The circuit of claim 9, wherein, the hash function comprises a secure hash algorithm 3 (SHA-3).

13. The circuit of claim 9, wherein, the signature is generated by a Rivest-Shamir-Adleman Algorithm (RSA).

14. The circuit of claim 9, wherein, the target device comprises a system-on-chip (SOC).

15. The circuit of claim 14, wherein, the plurality of data chunks comprise data used for configuring a block of programmable logic (PL).

16. The circuit of claim 14, wherein the memory is off-chip memory.

17. The circuit of claim 14, wherein, the memory is on-chip memory.

* * * * *

UNITED STATES PATENT AND TRADEMARK OFFICE
CERTIFICATE OF CORRECTION

| | |
|---|---|
| PATENT NO. | : 11,216,591 B1 |
| APPLICATION NO. | : 16/439350 |
| DATED | : January 4, 2022 |
| INVENTOR(S) | : Felix Burton |

It is certified that error appears in the above-identified patent and that said Letters Patent is hereby corrected as shown below:

In the Claims

Column 14, Line 66, in Claim 2, after "eight hash" insert -- and --.

Signed and Sealed this
Twenty-eighth Day of June, 2022

*Katherine Kelly Vidal*

Katherine Kelly Vidal
*Director of the United States Patent and Trademark Office*